US012136206B2

(12) United States Patent
Xiong et al.

(10) Patent No.: US 12,136,206 B2
(45) Date of Patent: Nov. 5, 2024

(54) METHOD FOR DETECTING SURFACE FLATNESS OF PRECAST BEAM BASED ON THREE-DIMENSIONAL POINT CLOUD MODEL

(71) Applicant: SOUTHEAST UNIVERSITY, Nanjing (CN)

(72) Inventors: Wen Xiong, Nanjing (CN); Chang Xu, Nanjing (CN); Yanjie Zhu, Nanjing (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 0 days.

(21) Appl. No.: 17/785,909

(22) PCT Filed: Nov. 15, 2021

(86) PCT No.: PCT/CN2021/130515
§ 371 (c)(1),
(2) Date: Jun. 16, 2022

(87) PCT Pub. No.: WO2023/060683
PCT Pub. Date: Apr. 20, 2023

(65) Prior Publication Data
US 2024/0177291 A1    May 30, 2024

(30) Foreign Application Priority Data
Oct. 13, 2021   (CN) .......................... 202111200770.7

(51) Int. Cl.
*G06T 7/00*   (2017.01)
*G06T 3/60*   (2024.01)

(52) U.S. Cl.
CPC .............. *G06T 7/0006* (2013.01); *G06T 3/60* (2013.01); *G06T 2207/10028* (2013.01); *G06T 2207/30132* (2013.01)

(58) Field of Classification Search
CPC ................... G06T 7/0006; G06T 3/60; G06T 2207/10028; G06T 2207/30132
See application file for complete search history.

(56) References Cited

U.S. PATENT DOCUMENTS 9,053,547 B2 *  6/2015  Kitamura ............... G01B 11/24
9,207,069 B2 * 12/2015  Kitamura ............... G01S 17/89
(Continued)

FOREIGN PATENT DOCUMENTS

| CN | 110823077 A | 2/2020 |
| CN | 112581421 A | 3/2021 |

(Continued)

OTHER PUBLICATIONS

Tang, Pingbo; Akinci, Burcu; Huber, Daniel, Characterization of three algorithms for detecting surface flatness defects from dense point clouds, Proceedings of SPIE, 2009, vol. 7239 (1), p. 72390N-72390N-12 (Year: 2009).*

*Primary Examiner* — Gregory M Desire
(74) *Attorney, Agent, or Firm* — MUNCY, GEISSLER, OLDS & LOWE, P.C.

(57) ABSTRACT

The present invention discloses a method for detecting surface flatness of a precast beam based on a three-dimensional point cloud model, including the following steps: (1) performing, according to a specific geometry of a three-dimensional point cloud model of a target component in a three-dimensional coordinate system, coarse calibration and fine calibration on the model sequentially to determine a spatial rotation matrix and perform point cloud coordinate calibration; (2) determining normal vectors at positions of points of the three-dimensional point cloud model of the component according to a principal component analysis method and a K-nearest-neighbor principle, so that a to-be-detected surface is segmented and extracted by defining a normal vector direction and a coordinate interval; and (3)

(Continued)

iteratively searching for an optimal reference plane according to a form relationship between the to-be-detected surface and the three-dimensional coordinate system and calculating flatness of the surface.

4 Claims, 5 Drawing Sheets

(56) References Cited

U.S. PATENT DOCUMENTS

| | | | |
|---|---|---|---|
| 10,223,810 B2 * | 3/2019 | Chou | H03M 7/3066 |
| 10,450,053 B2 * | 10/2019 | Doyle | G06F 30/17 |
| 10,607,106 B2 * | 3/2020 | Huang | G06T 7/136 |
| 11,003,804 B2 * | 5/2021 | Krishnamurthy | G06Q 10/08 |
| 11,049,267 B2 * | 6/2021 | Selviah | G06T 7/33 |
| 11,113,835 B2 * | 9/2021 | Cen | G06V 20/188 |
| 11,176,674 B2 * | 11/2021 | Diankov | G06T 7/50 |
| 11,633,857 B2 * | 4/2023 | Chen | G06V 20/10 |
| | | | 700/246 |
| 11,875,477 B2 * | 1/2024 | Wang | G06T 7/0002 |
| 11,879,997 B2 * | 1/2024 | Zweigle | G06T 7/0008 |
| 11,891,261 B2 * | 2/2024 | Ma | B21D 43/08 |

FOREIGN PATENT DOCUMENTS

| | | |
|---|---|---|
| CN | 113240637 A | 8/2021 |
| WO | WO2021136509 A1 | 7/2021 |

* cited by examiner

METHOD FOR DETECTING SURFACE FLATNESS OF PRECAST BEAM BASED ON THREE-DIMENSIONAL POINT CLOUD MODEL

TECHNICAL FIELD

The present invention relates to the field of detecting manufacturing quality of precast beams in bridge engineering, and specifically, to a method for detecting surface flatness of a precast beam based on a three-dimensional point cloud model.

BACKGROUND

As an important evaluation index for detecting the manufacturing quality of precast beams, flatness reflects the aesthetic effect of construction and has some impact on the mechanical properties of the precast beams during service. Flatness that fails to meet specifications represents unreliable manufacturing quality of the precast beams to some extent. Currently, in the methods for detecting the flatness of precast beam in practical projects, contact measurement methods such as feeler gauges and profilometers are usually used. Such methods have low detection efficiency and insufficient accuracy and produce detection results that are not easy to manage digitally. A three-dimensional point cloud model is a set of massive points that contain properties of a target surface. The spatial form of an object surface is reflected based on the three-dimensional coordinates of points. Surface feature information of a precast component is acquired by using a three-dimensional laser scanner. Compared with the conventional detection methods, the three-dimensional point cloud model has advantages such as a non-contact type, a high sampling rate, and a high degree of automation. However, based on the point cloud model that contains information data of massive three-dimensional coordinates, how to quickly extract a target surface from the entire model, how to accurately detect the flatness of the surface, and how to implement integration into automatic calculation steps need to be solved urgently.

SUMMARY

Objectives of the present invention: for a precast beam with a relatively regular geometric shape, a method for detecting surface flatness based on a three-dimensional point cloud model is provided, which is easy to be implemented by programming, and improves the calculation efficiency and the degree of automation compared with the conventional detection methods.

Technical solutions: a method for detecting surface flatness of a precast beam based on a three-dimensional point cloud model is provided, and includes the following steps:
(1) performing, according to a specific geometry of a three-dimensional point cloud model of a target component in a three-dimensional coordinate system, coarse calibration and fine calibration on the model sequentially to determine a spatial rotation matrix and perform point cloud coordinate calibration;
(2) determining normal vectors at positions of points of the three-dimensional point cloud model of the component according to a principal component analysis method and a K-nearest-neighbor principle, so that a to-be-detected surface is segmented and extracted by defining a normal vector direction and a coordinate interval; and
(3) iteratively searching for an optimal reference plane according to a form relationship between the to-be-detected surface and the three-dimensional coordinate system and calculating flatness of the surface.

Preferably, step (1), step (2), and step (3) all need to satisfy constraint conditions: a geometric shape of a precast beam is regular, a placement position of the precast beam is horizontal, an origin of the three-dimensional coordinate system is set at a centroid of the point cloud model, and directions of an X-axis, a Y-axis, and a Z-axis of the three-dimensional coordinate system are respectively parallel to directions of a beam width, a beam length, and a beam height of the component.

Preferably, step (1) specifically includes the following steps:
1.1 setting, for a three-dimensional point cloud model $Pt_0$ of the precast beam, an origin O of an original coordinate system $X_0Y_0Z_0$ at a centroid of the three-dimensional point cloud model:

$$Pt_c = \begin{bmatrix} x_1 - \mu_X & y_1 - \mu_Y & z_1 - \mu_Z \\ x_2 - \mu_X & y_2 - \mu_Y & z_2 - \mu_Z \\ & \vdots & \\ x_n - \mu_X & y_n - \mu_Y & z_n - \mu_Z \end{bmatrix},$$

where $Pt_c$ is a centralized three-dimensional point cloud model; $x_1, \ldots x_n$ are coordinate values of points $X_0$ in $Pt_0$, $y_1 \ldots y_n$ are coordinate values of $Y_0$, and $z_1 \ldots z_n$ are coordinate values of $Z_0$; and $\mu_X$ is an average value of the coordinate values of the points $X_0$ in $Pt_0$, $\mu_Y$ is an average value of the coordinate values of original $Y_0$, and $\mu_Z$ is an average value of the coordinate values of original $Z_0$;

1.2 determining, for the precast beam placed horizontally, that a positive direction of an initial $Z_1$ coordinate axis is an opposite direction of gravity and is parallel to a direction of the beam height, making a projection of the three-dimensional point cloud model $Pt_c$ onto a plane $X_0OY_0$, performing a principal component analysis on the projection to first decentralize a projected point cloud according to a principle of the principal component analysis, calculate a covariance matrix of the decentralized point cloud, and perform singular value decomposition on the covariance matrix to obtain a group of eigenvalues and an eigenvector uniquely corresponding to each eigenvalue, where an eigenvector corresponding to the largest eigenvalue is a first principal component, and an eigenvector corresponding to the second largest eigenvalue is a second principal component; and defining a direction of a $Y_1$ coordinate axis as a direction of the first principal component, and defining a direction of an $X_1$ coordinate axis as a direction of the second principal component, to complete calibration of an initial coordinate system $X_1Y_1Z_1$, that is, coarse calibration of coordinates of the three-dimensional point cloud model; and 1.3 respectively making slices at appropriate positions capable of reflecting features of the beam width, the beam length, and the beam height of the component, where thicknesses of the slices are twice a point cloud density; making a projection of points contained in the slices to a slice plane and performing the principal component analysis, fitting the projection to a straight line, and comparing angles between the projected straight line and two coordinate axes; and defining a direction of a coordinate axis with a smaller angle with the projected straight line as the direction of the first principal component according to the principle of the principal component analysis, and defining a direction of an other coordinate axis in the slice plane as the direction of the second principal component, to complete calibration of a final coordinate system XYZ, that is, fine calibration of the coordinates of the three-dimensional point cloud model after the steps are completed for all the directions of the beam width, the beam length, and the beam height; and calculating, according to an angle between the final coordinate system XYZ and the initial coordinate system $X_1Y_1Z_1$, rotation matrices $R_x$, $R_y$, and $R_z$ corresponding to the point cloud that changes from the initial coordinate system $X_1Y_1Z_1$ to the final coordinate system XYZ, where if a rotation direction of rotating from the initial coordinate system $X_1Y_1Z_1$ to the final coordinate system XYZ is counterclockwise rotation, the obtained rotation matrices $R_x$, $R_y$ and $R_z$ are respectively:

$$R_x = \begin{bmatrix} 1 & 0 & 0 \\ 0 & \cos\alpha & -\sin\alpha \\ 0 & \sin\alpha & \cos\alpha \end{bmatrix},$$

$$R_y = \begin{bmatrix} \cos\beta & 0 & \sin\beta \\ 0 & 1 & 0 \\ -\sin\beta & 0 & \cos\beta \end{bmatrix}, \text{ and}$$

$$R_z = \begin{bmatrix} \cos\gamma & -\sin\gamma & 0 \\ \sin\gamma & \cos\gamma & 0 \\ 0 & 0 & 1 \end{bmatrix},$$

and if the rotation direction is clockwise rotation, the obtained rotation matrices $R_x$, $R_y$, and $R_z$ are respectively:

$$R_x = \begin{bmatrix} 1 & 0 & 0 \\ 0 & \cos\alpha & \sin\alpha \\ 0 & -\sin\alpha & \cos\alpha \end{bmatrix},$$

$$R_y = \begin{bmatrix} \cos\beta & 0 & -\sin\beta \\ 0 & 1 & 0 \\ \sin\beta & 0 & \cos\beta \end{bmatrix}, \text{ and}$$

$$R_z = \begin{bmatrix} \cos\gamma & \sin\gamma & 0 \\ -\sin\gamma & \cos\gamma & 0 \\ 0 & 0 & 1 \end{bmatrix},$$

where $\alpha$ is an angle between a coordinate system $Y_1OZ_1$ and a coordinate system YOZ; $\beta$ is an angle between a coordinate system $X_1OZ_1$ and a coordinate system XOZ; and $\gamma$ is an angle between a coordinate system $X_1OY_1$ and a coordinate system XOY; and obtaining a spatial rotation matrix $R=R_x \cdot R_y \cdot R_z$ according to $R_x$, $R_y$, and $R_z$ to implement point cloud coordinate calibration:

$Pt=R \cdot Pt_c$.

where $Pt_c$ is a centralized three-dimensional point cloud model, and Pt is a three-dimensional point cloud model after coordinate calibration.

Preferably, step (2) specifically includes the following steps:

2.1 selecting, for an $i^{th}$ point $p_i(x_i, y_i, z_i)$ in the three-dimensional point cloud model Pt, K nearest neighbor points according to the K-nearest-neighbor principle:

$P_i^K = \{p_i^1, p_i^2 \ldots p_i^K | i \in \{1,2 \ldots N\}, K \in Z\}$, where N is the number of points in the three-dimensional point cloud model Pt, $P_i^K$ is a set of K nearest neighbor points of a point $p_i$, and $p_i^k$ is a $k^{th}$ neighbor point; and sequentially performing decentralization, covariance matrix calculation, and singular value decomposition on $P_i^K$ according to the principle of the principal component analysis, defining a normal vector $\vec{n_1}$ at a point $p_i(x_i, y_i, z_i)$ as an eigenvector corresponding to a minimum eigenvalue, and specifying that a direction of the normal vector $\vec{n_1}$ indicates a positive direction of a coordinate axis;

2.2 rotating a to-be-detected surface A that requires surface flatness detection in the precast beam to be parallel to a coordinate plane B:

$A \| B$, where the coordinate plane B is any plane of XOY, XOZ, and YOZ; setting a reference vector $\vec{n_r}$ as a unit vector perpendicular to the coordinate plane B, and calculating angles between normal vectors at points in the three-dimensional point cloud model Pt and the reference vector based on a vector angle formula, where an angle $\theta_i$ between a normal vector $\vec{n_i}$ at the $i^{th}$ point $p_i(x_i, y_i, z_i)$ in the three-dimensional point cloud model Pt and the reference vector $\vec{n_r}$ is:

$$\theta_i = \arccos\left(\frac{\vec{n_i} \cdot \vec{n_r}}{|\vec{n_i}||\vec{n_r}|}\right);$$

setting an angle threshold $\theta_s$ as $|\theta_s| \leq 5°$, where if a constraint condition $\theta_i \leq \theta_s$ is satisfied during calculation, that is, $\theta_i$ is not greater than the angle threshold $\theta_s$, the point $p_i(x_i, y_i, z_i)$ is a point forming the to-be-detected surface A, and the point is extracted into a set $A_1$; making, for points in the set $A_1$, a histogram by taking coordinate values of the points on a coordinate axis perpendicular to the to-be-detected surface A; and extracting points contained in an interval with a maximum frequency number into a set $A_2$; and 2.3 selecting, for an $h^{th}$ point $p_h(x_h, y_h, z_h)$ in the set $A_2$, K nearest neighbor points around the point to form a set $P_h^K$ according to the K-nearest-neighbor principle; defining a point distance $d_h$ of the point $p_h$ as an average value of distances between the point and points in the set $P_h^K$, and calculating an average value $\bar{d}$ and a standard deviation $\sigma$ of point distances in the set $A_2$ if a result is a Gaussian distribution:

$$\bar{d} = \frac{1}{N_{A_2}} \sum_{h=1}^{N_{A_2}} d_h, \sigma = \sqrt{\frac{1}{N_{A_2}} \sum_{h=1}^{N_{A_2}} (d_h - \bar{d})^2}, h \in \{1, 2 \ldots N_{A_2}\},$$

where $N_{A_2}$ is the number of points in the set $A_2$; and setting $\bar{d}+2\sigma$ as a distance threshold, where if a constraint condition: $d_h \leq \bar{d}+2\sigma$ is satisfied during calculation, that is, the point distance is not greater than the distance threshold, the point $p_h(x_h, y_h, z_h)$ is a point forming the to-be-detected surface, and is extracted into the to-be-detected surface A.

Preferably, step (3) specifically includes the following steps:
- 3.1 because the to-be-detected surface A is formed by three-dimensional coordinate points and has a particular thickness, making, by passing through a point nearest to the coordinate plane B in the to-be-detected surface A, a reference plane $RP_1$ parallel to the coordinate plane B, the reference plane $RP_1$ being $a_1x+b_1y+c_1z+d_1=0$; and making, by passing through a point farthest from the coordinate plane B in the to-be-detected surface A, a reference plane $RP_n$ parallel to the coordinate plane B, the reference plane $RP_n$ being $a_nx+b_ny+c_nz+d_n=0$, where $a_1$, $b_1$, $c_1$, $d_1$, $a_n$, $b_n$, $c_n$, and $d_n$ are coefficients;

setting an iteration distance t as a point cloud density in the to-be-detected surface A, gradually translating the reference plane from $RP_1$ to $RP_n$ by an increment of t, and calculating distances between points in the to-be-detected surface A and reference planes at each moving moment, where a Euclidean distance $r_j$ between a $j^{th}$ point $p_j(x_j, y_j, z_j)$ in the to-be-detected surface A and an $m^{th}$ reference plane $RP_m$ is:

$$r_j = \left| \frac{a_m x_j + b_m y_j + c_m z_j + d_m}{\sqrt{a_m^2 + b_m^2 + c_m^2}} \right|, j \in \{1, 2 \ldots N_A\}, m \in \{1, 2 \ldots N_n\},$$

where $N_A$ is the number of points in the to-be-detected surface A, $N_n$ is the number of reference planes, an expression of the reference plane $RP_m$ is $a_mx+b_my+c_mz+d_m=0$, and $a_m$, $b_m$, $c_m$, and $d_m$ are coefficients; and defining, according to a least absolute deviation method, an optimal reference plane $RP_A$ as a corresponding reference plane when a sum of $r_j$ of the points in the to-be-detected surface A is minimal:

$$RP_A(r_j) = \mathrm{argmin} \sum_{j=1}^{N_A} r_j,$$

where an expression of the optimal reference plane $RP_A$ is $a_Ax+b_Ay+c_Az+d_A=0$, and $a_A$, $b_A$, $c_A$, and $d_A$ are coefficients; and

- 3.2 defining, for the $j^{th}$ point $p_j(x_j, y_j, z_j)$ in the to-be-detected surface A, surface flatness $f_j$ at the point as a Euclidean distance between the point $p_j$ and the optimal reference plane $RP_A$:

$$f_j = \left| \frac{a_A x_j + b_A y_j + c_A z_j + d_A}{\sqrt{a_A^2 + b_A^2 + c_A^2}} \right|, j \in \{1, 2 \ldots N_A\};$$

obtaining a flatness distribution map of the to-be-detected surface A through marking with different colors according to a value of $f_j$, to complete detection of surface flatness of the precast beam.

Beneficial effects: Compared with the existing technology, the technical solution of the present invention has the following beneficial technical effects:

The present invention implements quick and accurate detection of flatness of a precast beam by performing coordinate calibration, target surface segmentation, and determination of an optimal reference plane on a three-dimensional point cloud model of the precast beam, which is beneficial to improving the calculation efficiency and the degree of automation. Avoiding the problem that the conventional contact measurement is prone to errors and results of the conventional contact measurement are less integrated, thereby saving calculation time and improving the degree of digital integration of detection results.

DETAILED DESCRIPTION

The technical solution of the present invention is further described below with reference to the drawings and specific embodiments.

The present invention needs to satisfy the following constraint conditions:
- (1) A precast beam has a regular geometric shape. Generally, shapes of precast beams are regular basic patterns, mainly a rectangle, an I-shaped figure, etc. The present invention describes the specific implementation method by taking a cuboid beam with a square cross-section as an example.
- (2) A placement position of the precast beam is basically horizontal, that is, there is a relatively small deviation between a direction of a Z-coordinate axis of a three-dimensional point cloud model and a direction of a beam height, which facilitates implementation of coordinate calibration.
- (3) An origin of a three-dimensional coordinate system is set at a centroid of the three-dimensional point cloud model, a direction of an X-coordinate axis is parallel to a direction of a beam width, a direction of a Y-coordinate axis is parallel to a direction of a beam length, and the direction of the Z-coordinate axis is an opposite direction of gravity and is parallel to the direction of the beam height. For a regular precast beam model, the three-dimensional coordinate system is calibrated according to geometric features, making calculation and programming more convenient.

Figure 1:
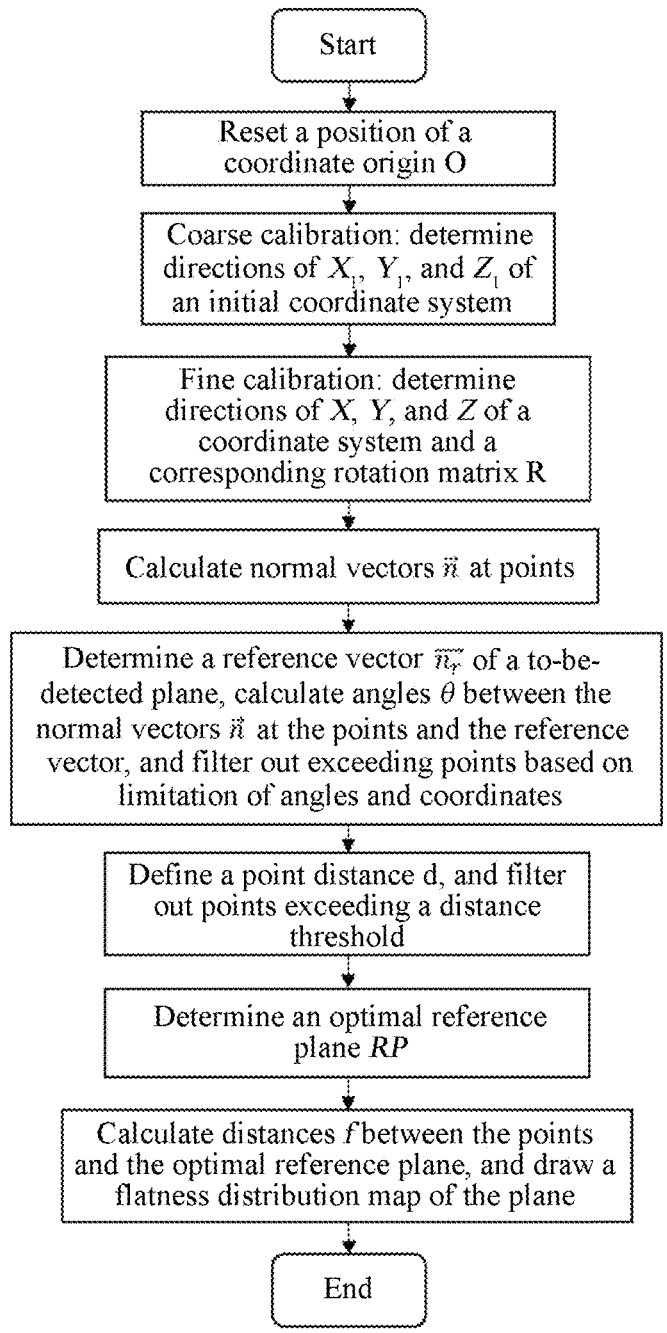
FIG. 1 is a flowchart of a method for detecting surface flatness of a precast beam based on a three-dimensional point cloud model according to the present invention.

As shown in FIG. 1, a method for detecting surface flatness of a precast beam based on a three-dimensional point cloud model in the present invention mainly includes the following steps:
- (1) performing, according to a specific geometry of a three-dimensional point cloud model of a target component in a three-dimensional coordinate system, coarse calibration and fine calibration on the model sequentially to determine a spatial rotation matrix and perform point cloud coordinate calibration;
- (2) determining normal vectors at positions of points of the three-dimensional point cloud model of the component according to a principal component analysis method and a K-nearest-neighbor principle, so that a to-be-detected surface is segmented and extracted by defining a normal vector direction and a coordinate interval; and (3) iteratively searching for an optimal reference plane according to a form relationship between the to-be-detected surface and the three-dimensional coordinate system and calculating flatness of the surface.

In this embodiment, step 1 specifically includes the following steps.

1.1 For a three-dimensional point cloud model $Pt_0$ of a precast beam, an origin O of an original coordinate system $X_0Y_0Z_0$ is set at a centroid of the three-dimensional point cloud model:

$$Pt_c = \begin{bmatrix} x_1 - \mu_X & y_1 - \mu_Y & z_1 - \mu_Z \\ x_2 - \mu_X & y_2 - \mu_Y & z_2 - \mu_Z \\ & \vdots & \\ x_n - \mu_X & y_n - \mu_Y & z_n - \mu_Z \end{bmatrix},$$

where $Pt_c$ is a centralized three-dimensional point cloud model; $x_1 \ldots x_n$ are coordinate values of points $X_0$ in $Pt_0$, $y_1 \ldots y_n$ are coordinate values of $Y_0$, and $z_1 \ldots z_n$ are coordinate values of $Z_0$; and $\mu_X$ is an average value of the coordinate values of the points $X_0$ in $Pt_0$, $\mu_Y$ is an average value of the coordinate values of original $Y_0$, and $\mu_Z$ is an average value of the coordinate values of original $Z_0$; the algorithm of the present invention mainly targets a precast beam with a regular geometric shape, and an origin of a coordinate axis is set at a position of a centroid of the model, which can effectively simplify calculation and improve the efficiency.

1.2 The algorithm of the present invention mainly targets the precast beam placed horizontally. Therefore, it may be approximately determined that a positive direction of an initial $Z_1$ coordinate axis is the opposite direction of gravity and is approximately parallel to the direction of the beam height. A projection of the three-dimensional point cloud model $Pt_c$ is made on a plane $X_0OY_0$, and a principal component analysis is performed on the projection. A projected point cloud is first decentralized according to a principle of the principal component analysis, a covariance matrix of the decentralized point cloud is calculated, and singular value decomposition is performed on the covariance matrix to obtain a group of eigenvalues and an eigenvector uniquely corresponding to each eigenvalue, where an eigenvector corresponding to the largest eigenvalue is a first principal component, and an eigenvector corresponding to the second largest eigenvalue is a second principal component. A direction of a $Y_1$ coordinate axis is defined as a direction of the first principal component, and a direction of an $X_1$ coordinate axis is defined as a direction of the second principal component, to complete calibration of an initial coordinate system $X_1Y_1Z_1$, that is, coarse calibration of coordinates of the three-dimensional point cloud model.

Figure 2:
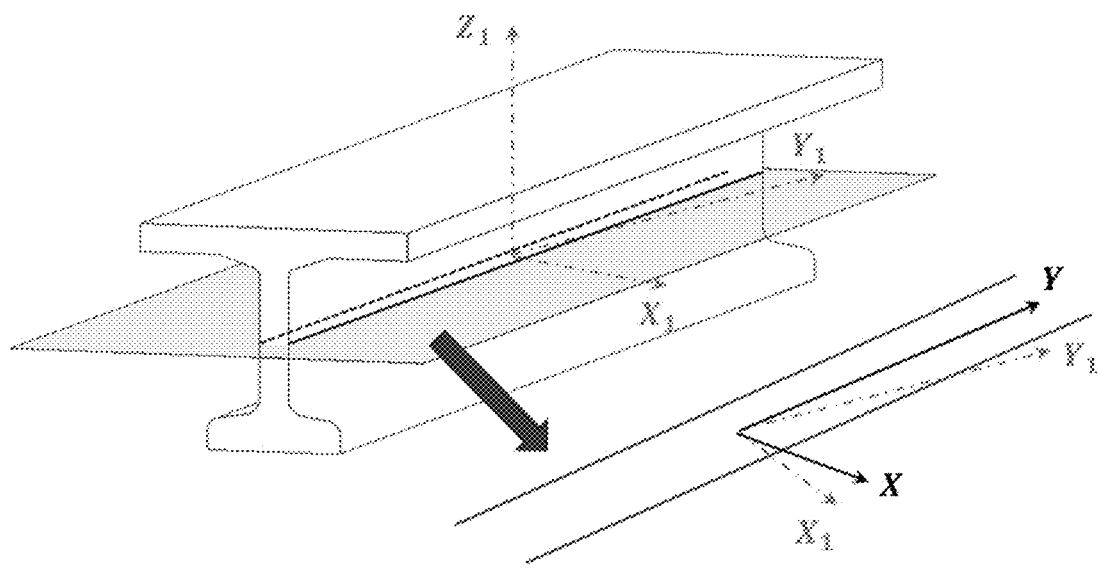
FIG. 2 is a schematic diagram of implementing fine calibration of coordinate axes according to slice features.

1.3 Referring to FIG. 2, slices are respectively made at appropriate positions capable of reflecting features of the beam width, the beam length, and the beam height of the component, where thicknesses of the slices are twice a point cloud density, and the obtained slices may have the following characteristics: a. the slices have a sufficient length; and b. It should be ensured as much as possible that points contained in the slices is clear and continuous. Short slices or insufficient continuity may easily lead to identification errors during the principal component analysis.

A projection of the points contained in the slices is made to a slice plane, the principal component analysis is performed, and the projection of the points may be approximated as a straight line. By comparing angles between the projected straight line and two coordinate axes according to the principle of the principal component analysis, a direction of a coordinate axis which has a smaller angle with the projected straight line is defined as the direction of the first principal component, and a direction of an other coordinate axis in the slice plane is defined as the direction of the second principal component. After the steps for the directions of the beam width, the beam length, and the beam height are completed, calibration of a final coordinate system XYZ, that is, fine calibration of the coordinates of the three-dimensional point cloud model, is completed.

According to an angle between the final coordinate system XYZ and the initial coordinate system $X_1Y_1Z_1$, rotation matrices $R_x$, $R_y$, and $R_z$ corresponding to the point cloud that changes from the initial coordinate system $X_1Y_1Z_1$ to the final coordinate system XYZ are calculated. If a rotation direction of rotating from the initial coordinate system $X_1Y_1Z_1$ to the final coordinate system XYZ is counterclockwise rotation, the obtained rotation matrices $R_x$, $R_y$, and $R_z$ are respectively:

$$R_x = \begin{bmatrix} 1 & 0 & 0 \\ 0 & \cos\alpha & -\sin\alpha \\ 0 & \sin\alpha & \cos\alpha \end{bmatrix},$$

$$R_y = \begin{bmatrix} \cos\beta & 0 & \sin\beta \\ 0 & 1 & 0 \\ -\sin\beta & 0 & \cos\beta \end{bmatrix}, \text{ and}$$

$$R_z = \begin{bmatrix} \cos\gamma & -\sin\gamma & 0 \\ \sin\gamma & \cos\gamma & 0 \\ 0 & 0 & 1 \end{bmatrix},$$

and if the rotation direction is clockwise rotation, the obtained rotation matrices $R_x$, $R_y$, and $R_z$ are respectively:

$$R_x = \begin{bmatrix} 1 & 0 & 0 \\ 0 & \cos\alpha & \sin\alpha \\ 0 & -\sin\alpha & \cos\alpha \end{bmatrix},$$

$$R_y = \begin{bmatrix} \cos\beta & 0 & -\sin\beta \\ 0 & 1 & 0 \\ \sin\beta & 0 & \cos\beta \end{bmatrix}, \text{ and}$$

$$R_z = \begin{bmatrix} \cos\gamma & \sin\gamma & 0 \\ -\sin\gamma & \cos\gamma & 0 \\ 0 & 0 & 1 \end{bmatrix},$$

where $\alpha$ is an angle between a coordinate system $Y_1OZ_1$ and a coordinate system YOZ; $\beta$ is an angle between a coordinate system $X_1OZ_1$ and a coordinate system XOZ; and $\gamma$ is an angle between a coordinate system $X_1OY_1$ and a coordinate system XOY.

In summary, a spatial rotation matrix $R = R_x \cdot R_y \cdot R_z$ is obtained, to implement point cloud coordinate calibration:

$$Pt = R \cdot Pt_c,$$

where $Pt_c$ is a centralized three-dimensional point cloud model, and Pt is a three-dimensional point cloud model after coordinate calibration.

In this embodiment, step 2 specifically includes the following steps.

Figure 3:
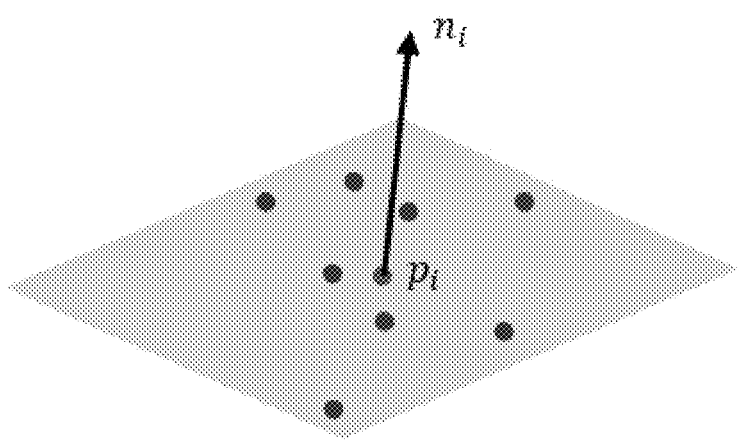
FIG. 3 is a schematic diagram of a normal vector $n_i$ at an $i^{th}$ point $p_i$.

2.1 Referring to FIG. 3, for an $i^{th}$ point $p_i(x_i, y_i, z_i)$ in a three-dimensional point cloud model Pt, K nearest neighbor points are selected according to the K-nearest-neighbor principle:

$$P_i^K = \{p_i^1, p_i^2 \ldots p_i^K | i \in \{1,2 \ldots N\}, K \in Z\},$$

where N is the number of points in the three-dimensional point cloud model Pt, $P_i^K$ is a set of K nearest neighbor points of a point $p_i$, and $p_i^K$ is neighbor points.

Decentralization, covariance matrix calculation, and singular value decomposition are sequentially performed on $P_i^K$ according to the principle of the principal component analysis, a normal vector $\vec{n_1}$ at a point $p_i(x_i, y_i, z_i)$ is defined as an eigenvector corresponding to a minimum eigenvalue, and it is specified that a direction of the normal vector $\vec{n_1}$ indicates a positive direction of a coordinate axis. The principle is to fit a plane based on the K neighbor points of the point $p_i(x_i, y_i, z_i)$, and convert calculation of the normal vector at the point $p_i$ into calculation of a normal vector of the above fitted plane.

2.2 A to-be-detected surface A that requires surface flatness detection in the precast beam is rotated to be parallel to a coordinate plane B:

$$A \| B.$$

where the coordinate plane B is any plane of XOY, XOZ, and YOZ. A reference vector $\vec{n_r}$ is set as a unit vector perpendicular to the coordinate plane B, and angles between normal vectors at points in the three-dimensional point cloud model Pt and the reference vector are calculated based on a vector angle formula, where an angle $\theta_i$ between a normal vector $\vec{n_1}$ at the $i^{th}$ point $p_i(x_i, y_i, z_i)$ in the three-dimensional point cloud model Pt and the reference vector is:

$$\theta_i = \arccos\left(\frac{\vec{n_i} \cdot \vec{n_r}}{|\vec{n_i}||\vec{n_r}|}\right).$$

An angle threshold $\theta_s$ is set as $|\theta_s| \leq 5°$. If a constraint condition $\theta_i \leq \theta_s$ is satisfied during calculation, that is, $\theta_i$ is not greater than the angle threshold $\theta_s$, the point $p_i(x_i, y_i, z_i)$ is a point forming the to-be-detected surface A, and the point is extracted into a set $A_1$.

Figure 4:
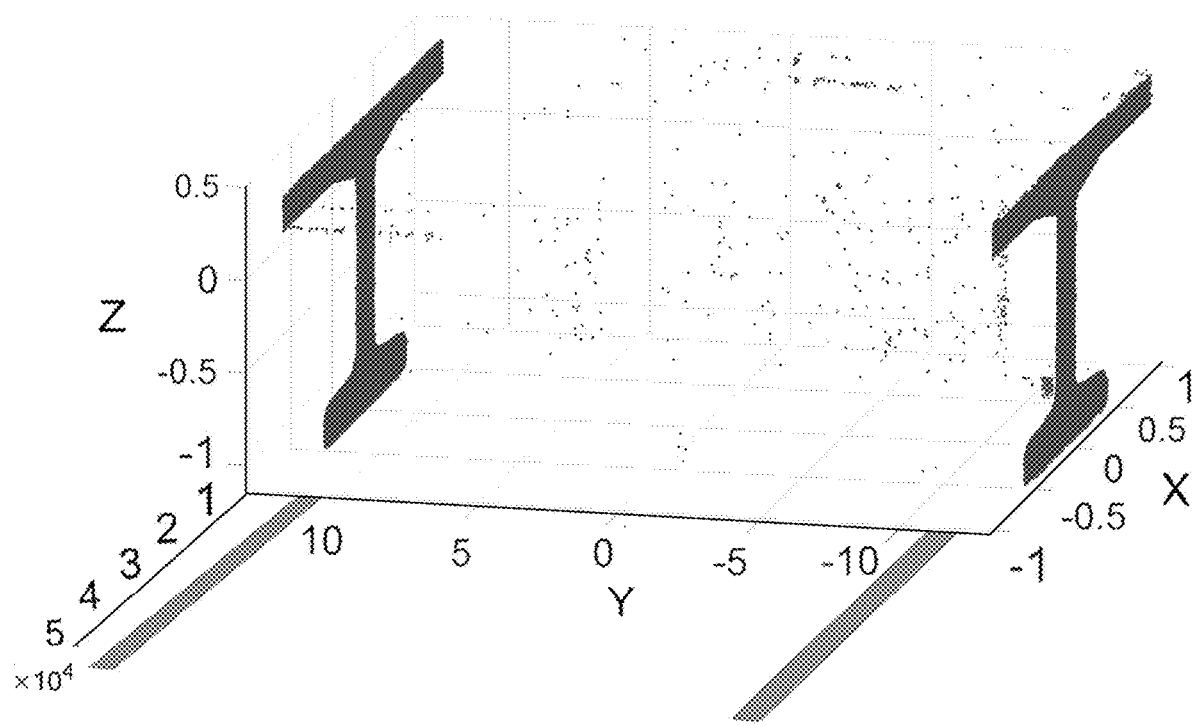
FIG. 4 is a schematic diagram of a histogram of a surface feature.

Referring to FIG. 4, for points in the set $A_1$, a histogram is made by taking coordinate values of the points on a coordinate axis perpendicular to the to-be-detected surface A, and points included in an interval with a maximum frequency number are extracted into a set $A_2$.

2.3 For an $h^{th}$ point $p_h(x_h, y_h, z_h)$ in the set $A_2$, K nearest neighbor points around the point are selected to form a set $P_h^K$ according to the K-nearest-neighbor principle. A point distance $d_h$ of the point $p_h$ is defined as an average value of distances between the point and points in the set $P_h^K$, and an average value $\bar{d}$ and a standard deviation $\sigma$ of point distances in the set $A_2$ are calculated if a result is a Gaussian distribution:

$$\bar{d} = \frac{1}{N_{A_2}} \sum_{h=1}^{N_{A_2}} d_h, \sigma = \sqrt{\frac{1}{N_{A_2}} \sum_{h=1}^{N_{A_2}} (d_h - \bar{d})^2}, h \in \{1, 2 \ldots N_{A_2}\},$$

where $N_{A_2}$ is the number of points in the set $A_2$. $\bar{d} + 2\sigma$ is set as a distance threshold, where if a constraint condition: $d_h \leq \bar{d} + 2\sigma$ is satisfied during calculation, that is, the point distance is not greater than the distance threshold, the point $p_h(x_h, y_h, z_h)$ is a point forming the to-be-detected surface, and is extracted into the to-be-detected surface A.

In this embodiment, step 3 specifically includes the following steps.

3.1 Because the to-be-detected surface A is formed by three-dimensional coordinate points and has a particular thickness, a reference plane $RP_1(a_1x+b_1y+c_1z+d_1=0)$ parallel to the coordinate plane B is made by passing through a point nearest to the coordinate plane B in the to-be-detected surface A; and a reference plane $RP_n(a_nx+b_ny+c_nz+d_n=0)$ parallel to the coordinate plane B is made by passing through a point farthest from the coordinate plane B in the to-be-detected surface A.

Figure 5:
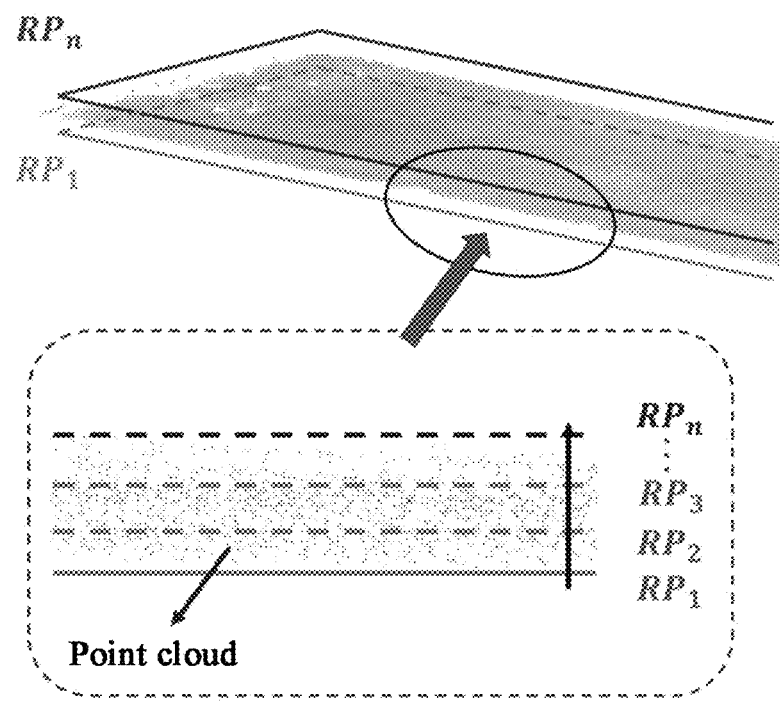
FIG. 5 is a schematic diagram of a process of searching for an optimal reference plane.

Referring to FIG. 5, an iteration distance t is set as a point cloud density in the to-be-detected surface A, the reference plane is gradually translated from $RP_1$ to $RP_n$ by an increment of t, and distances between points in the to-be-detected surface A and reference planes are calculated at each moving moment, where a Euclidean distance $r_j$ between a $j^{th}$ point $p_j(x_j, y_j, z_j)$ in the to-be-detected surface A and an $m^{th}$ reference plane $RP_m(a_mx+b_my+c_mz+d_m=0)$ is:

$$r_j = \left|\frac{a_m x_j + b_m y_j + c_m z_j + d_m}{\sqrt{a_m^2 + b_m^2 + c_m^2}}\right|, j \in \{1, 2 \ldots N_A\}, m \in \{1, 2 \ldots N_n\},$$

where $N_A$ is the number of points in the to-be-detected surface A, and $N_n$ is the number of reference planes.

According to a least absolute deviation method, an optimal reference plane $RP_A(a_Ax+b_Ay+c_Az+d_A=0)$ is defined as a corresponding reference plane when a sum of $r_j$ of the points in the to-be-detected surface A is minimal:

$$RP_A(r_j) = \operatorname{argmin} \sum_{j=1}^{N_A} r_j.$$

3.2 For the $j^{th}$ point $p_j(x_j, y_j, z_j)$ in the to-be-detected surface A, surface flatness $f_j$ at the point is defined as a Euclidean distance between the point $p_j$ and the optimal reference plane $RP_A(a_Ax+b_Ay+c_Az+d_A=0)$:

$$f_j = \left|\frac{a_A x_j + b_A y_j + c_A z_j + d_A}{\sqrt{a_A^2 + b_A^2 + c_A^2}}\right|, j \in \{1, 2 \ldots N_A\}.$$

A flatness distribution map of the to-be-detected surface A may be obtained through marking with different colors according to a value of $f_j$, to complete detection of surface flatness of the precast beam.

Because the algorithm is established based on a plurality of constraint conditions, the algorithm is not suitable for detection of surface flatness of all precast beams. However, for most of the commonly used types of precast beams in practical engineering, the algorithm can greatly improve the calculation efficiency and the automation degree of the flatness detection link compared with the existing conventional detection methods.

The following further describes the technical solutions of the present invention with reference to specific cases. The case calculation mainly performs algorithm programming based on MATLAB, to obtain calculation results.

The studied precast beam is a cuboid beam with a square cross-section, a beam length is 10 m, a beam width is 2 m, a beam height is 2 m, and a point cloud density is 1/cm². An area that has a width of 0.1 m and a length of 0.2 m and is 0.003 m above an original plane is preset at an end of a top surface of the beam, to simulate the situation that the precast beam is not flat. Rotation matrices are applied in advance:

$$R_x = \begin{bmatrix} 1 & 0 & 0 \\ 0 & 1 & 0.0015 \\ 0 & -0.0015 & 1 \end{bmatrix},$$

$$R_y = \begin{bmatrix} 1 & 0 & -0.0042 \\ 0 & 1 & 0 \\ 0.0042 & 0 & 1 \end{bmatrix}, \text{ and}$$

$$R_z = \begin{bmatrix} 1 & 0.0029 & 0 \\ -0.0029 & 1 & 0 \\ 0 & 0 & 1 \end{bmatrix}.$$

1. Decentralization is performed on a three-dimensional point cloud model of the precast beam, and coarse calibration is performed according to an initial form of the three-dimensional point cloud model, to obtain a rotation matrix $$Rot_{z1} = \begin{bmatrix} 1 & -0.0017 & 0 \\ 0.0017 & 1 & 0 \\ 0 & 0 & 1 \end{bmatrix}.$$

Subsequently, according to step 1.3, fine calibration is respectively performed on directions of three coordinate axes in the three-dimensional point cloud model, to obtain rotation matrices:

$$Rot_x = \begin{bmatrix} 1 & 0 & 0 \\ 0 & 1 & -0.0015 \\ 0 & 0.0015 & 1 \end{bmatrix},$$

$$Rot_y = \begin{bmatrix} 1 & 0 & 0.0042 \\ 0 & 1 & 0 \\ -0.0042 & 0 & 1 \end{bmatrix}, \text{ and}$$

$$Rot_{z2} = \begin{bmatrix} 1 & -0.0012 & 0 \\ 0.0012 & 1 & 0 \\ 0 & 0 & 1 \end{bmatrix}.$$

The rotation matrices are consistent with the preset rotation matrices.

2. According to step 2.1, normal vectors at points are calculated. To extract a point cloud contained in the top surface, a reference normal vector $\vec{n}_r=(0,0,1)$ is set, and angles between the normal vectors at the points and the reference normal vector are calculated. An angle threshold $\theta_s$ is set to be greater than or equal to 5°, it is sequentially determined whether the normal vectors at the points satisfy a standard, and points that satisfy a determining condition $\theta_i \leq \theta_s$ are extracted into a set $A_2$. A histogram is made with a width of 0.1 m by selecting z-coordinates of the points in the set $A_2$, and points corresponding to units that include more than 5000 three-dimensional points whose z-coordinates are greater than 0 are extracted. According to step 2.3, point distances, an average point distance, and a standard deviation of the extracted points are calculated, and points exceeding a distance threshold $\bar{d}+2\sigma$ are filtered out, to obtain a final point cloud of the top surface.

3. According to step 3.1, a reference plane $z=\min z$ is made, and is moved to $z=\max z$ by an increment of 0.0001 m. For each reference plane $z=z_i$, distances between the points and the reference plane are calculated. An optimal reference plane is finally determined as $z=0.9991$, and a distance between a non-flat part and the optimal reference plane is 0.003 m, and is consistent with the initial setting.

The present invention relates to a list of symbols and parameters as follows:

| | Centralized three-dimensional point cloud model | | Original coordinate system | | Initial coordinate system |
|---|---|---|---|---|---|
| $Pt_c$ | | $X_0Y_0Z_0$ | | $X_1Y_1Z_1$ | |
| $x_i$ | X-coordinate value of a point i | $y_i$ | Y-coordinate value of the point i | $z_i$ | Z-coordinate value of the point i |
| $R_x$ | Rotation matrix around an X-axis | $R_y$ | Rotation matrix around a Y-axis | $R_z$ | Rotation matrix around a Z-axis |
| $\alpha$ | Angle between a coordinate system $Y_1OZ_1$ and a coordinate system YOZ | $\beta$ | Angle between a coordinate system $X_1OZ_1$ and a coordinate system XOZ | $\gamma$ | Angle between a coordinate system $X_1OY_1$ and a coordinate system XOY |
| K | The number of nearest neighbor points | $p_i$ | $i^{th}$ three-dimensional coordinate point | | |
| $P_i^K$ | Set of K nearest neighbor points of the $i^{th}$ point p; | $p_i^K$ | Neighbor point | | |
| $p_i^j$ | $j^{th}$ neighbor point of $p_i$ | $p_c$ | Midpoint of K neighbor points | A | To-be-detected surface |
| $\vec{n}_r$ | Reference vector | $\vec{n}_i$ | Normal vector at an $i^{th}$ point | $\theta_i$ | angle between the normal vector $\vec{n}_i$ and the reference vector |

-continued

| $Pt_c$ | Centralized three-dimensional point cloud model | $X_0Y_0Z_0$ | Original coordinate system | $X_1Y_1Z_1$ | Initial coordinate system |
|---|---|---|---|---|---|
| $\theta_s$ | Angle threshold | $A_1$ | Set of points at which normal vectors satisfy a threshold | $A_2$ | Set of points whose coordinates are in a specified range |
| $d_i$ | Point distance | $\bar{d}$ | Average value of point distances | $\sigma$ | Standard deviation of the point distances |
| N | The number of points in the three-dimensional point cloud model | $N_A$ | The number of points in a set A | $N_{A_2}$ | The number of points in a set $A_2$ |
| $RP_A$ | Optimal reference plane of the surface A | $z_r$ | z-coordinate value corresponding to a reference plane | $f_i$ | Surface flatness at the point i |

The foregoing content further describes the present invention in detail with reference to only one specific embodiment, and it should not be considered that the present invention is limited to these descriptions. A person of ordinary skill in the art can further make simple deductions or replacements without departing from the concept of the present invention, and such deductions or replacements should all be considered as falling within the protection scope of the present invention.

What is claimed is:

1. A method for detecting surface flatness of a precast beam based on a three-dimensional point cloud model, comprising the following steps:

(1) performing, according to a specific geometry of a three-dimensional point cloud model of a target component in a three-dimensional coordinate system, coarse calibration and fine calibration on the model sequentially to determine a spatial rotation matrix and perform point cloud coordinate calibration;

(2) determining normal vectors at positions of points of the three-dimensional point cloud model of the component according to a principal component analysis method and a K-nearest-neighbor principle, so that a to-be-detected surface is segmented and extracted by defining a normal vector direction and a coordinate interval; and (3) iteratively searching for an optimal reference plane according to a form relationship between the to-be-detected surface and the three-dimensional coordinate system and calculating flatness of the surface, wherein step (1) specifically comprises the following steps:

1.1 setting, for a three-dimensional point cloud model $Pt_0$ of the precast beam, an origin O of an original coordinate system $X_0Y_0Z_0$ at a centroid of the three-dimensional point cloud model:

$$Pt_c = \begin{bmatrix} x_1 - \mu_X & y_1 - \mu_Y & z_1 - \mu_Z \\ x_2 - \mu_X & y_1 - \mu_Y & z_1 - \mu_Z \\ \vdots & & \\ x_n - \mu_X & y_n - \mu_Y & z_n - \mu_Z \end{bmatrix},$$

wherein $Pt_c$ is a centralized three-dimensional point cloud model; $x_1 \ldots x_n$ are coordinate values of points $X_0$ in $Pt_0$, $y_1 \ldots y_n$ are coordinate values of $Y_0$, and $z_1 \ldots z_n$ are coordinate values of $Z_0$; and $\mu_X$ is an average value of the coordinate values of the points $X_0$ in $Pt_0$, $\mu_Y$ is an average value of the coordinate values of original $Y_0$, and $\mu_z$ is an average value of the coordinate values of original $Z_0$;

1.2 determining, for the precast beam placed horizontally, that a positive direction of an initial $Z_1$ coordinate axis is an opposite direction of gravity and is parallel to a direction of the beam height, making a projection of the three-dimensional point cloud model $Pt_c$ onto a plane $X_0OY_0$, performing a principal component analysis on the projection to first decentralize a projected point cloud according to a principle of the principal component analysis, calculate a covariance matrix of the decentralized point cloud, and perform singular value decomposition on the covariance matrix to obtain a group of eigenvalues and an eigenvector uniquely corresponding to each eigenvalue, wherein an eigenvector corresponding to the largest eigenvalue is a first principal component, and an eigenvector corresponding to the second largest eigenvalue is a second principal component; and defining a direction of a $Y_1$ coordinate axis as a direction of the first principal component, and defining a direction of an $X_1$ coordinate axis as a direction of the second principal component, to complete calibration of an initial coordinate system $X_1Y_1Z_1$, that is, coarse calibration of coordinates of the three-dimensional point cloud model; and 1.3 respectively making slices at appropriate positions capable of reflecting features of the beam width, the beam length, and the beam height of the component, wherein thicknesses of the slices are twice a point cloud density; making a projection of points contained in the slices to a slice plane and performing the principal component analysis, fitting the projection to a straight line, and comparing angles between the projected straight line and two coordinate axes; and defining a direction of a coordinate axis with a smaller angle with the projected straight line as the direction of the first principal component according to the principle of the principal component analysis, and defining a direction of an other coordinate axis in the slice plane as the direction of the second principal component, to complete calibration of a final coordinate system XYZ, that is, fine calibration of the coordinates of the three-dimensional point cloud model after the steps are completed for all the directions of the beam width, the beam length, and the beam height; and calculating, according to an angle between the final coordinate system XYZ and the initial coordinate system $X_1Y_1Z_1$, rotation matrices $R_x$, $R_y$, and $R_z$ corresponding to the point cloud that changes from the initial coordinate system $X_1Y_1Z_1$ to the final coordinate system XYZ, wherein if a rotation direction of rotating from the initial coordinate system $X_1Y_1Z_1$ to the final coordinate system XYZ is counterclockwise rotation, the obtained rotation matrices $R_x$, $R_y$, and $R_z$ are respectively:

$$R_x = \begin{bmatrix} 1 & 0 & 0 \\ 0 & \cos\alpha & -\sin\alpha \\ 0 & \sin\alpha & \cos\alpha \end{bmatrix},$$

$$R_y = \begin{bmatrix} \cos\beta & 0 & \sin\beta \\ 0 & 1 & 0 \\ -\sin\beta & 0 & \cos\beta \end{bmatrix}, \text{ and}$$

$$R_z = \begin{bmatrix} \cos\gamma & -\sin\gamma & 0 \\ \sin\gamma & \cos\gamma & 0 \\ 0 & 0 & 1 \end{bmatrix},$$

and
if the rotation direction is clockwise rotation, the obtained rotation matrices $R_x$, $R_y$, and $R_z$ are respectively:

$$R_x = \begin{bmatrix} 1 & 0 & 0 \\ 0 & \cos\alpha & \sin\alpha \\ 0 & -\sin\alpha & \cos\alpha \end{bmatrix},$$

$$R_y = \begin{bmatrix} \cos\beta & 0 & -\sin\beta \\ 0 & 1 & 0 \\ \sin\beta & 0 & \cos\beta \end{bmatrix}, \text{ and}$$

$$R_z = \begin{bmatrix} \cos\gamma & \sin\gamma & 0 \\ -\sin\gamma & \cos\gamma & 0 \\ 0 & 0 & 1 \end{bmatrix},$$

wherein a is an angle between a coordinate system $Y_1OZ_1$ and a coordinate system YOZ; $\beta$ is an angle between a coordinate system $X_1OZ_1$ and a coordinate system XOZ; and $\gamma$ is an angle between a coordinate system $X_1OY_1$ and a coordinate system XOY; and obtaining a spatial rotation matrix $R = R_x \cdot R_y \cdot R_z$ according to $R_x$, $R_y$, $R_z$, to implement point cloud coordinate calibration:

$Pt = R \cdot Pt_c$, wherein $Pt_c$ is a centralized three-dimensional point cloud model, and Pt is a three-dimensional point cloud model after coordinate calibration.

2. The method for detecting surface flatness of a precast beam based on a three-dimensional point cloud model according to claim 1, wherein step (1), step (2), and step (3) all need to satisfy constraint conditions: a geometric shape of a precast beam is regular, a placement position of the precast beam is horizontal, an origin of the three-dimensional coordinate system is set at a centroid of the point cloud model, and directions of an X-axis, a Y-axis, and a Z-axis of the three-dimensional coordinate system are respectively parallel to directions of a beam width, a beam length, and a beam height of the component.

3. The method for detecting surface flatness of a precast beam based on a three-dimensional point cloud model according to claim 2, wherein step (2) specifically comprises the following steps:

2.1 selecting, for an $i^{th}$ point $p_i(x_i, y_i, z_i)$ in the three-dimensional point cloud model Pt, K nearest neighbor points according to the K-nearest-neighbor principle:

$P_i^K = \{p_i^1, p_i^2 \ldots p_i^K | i \in \{1,2 \ldots N\}, K \in Z\}$, wherein N is the number of points in the three-dimensional point cloud model Pt, $P_i^K$ is a set of K nearest neighbor points of a point $p_i$, and $p_i^K$ is a $k^{th}$ neighbor point; and sequentially performing decentralization, covariance matrix calculation, and singular value decomposition on $P_i^K$ according to the principle of the principal component analysis, defining a normal vector $\vec{n}_i$ at a point $p_i(x_i, y_i, z_i)$ as an eigenvector corresponding to a minimum eigenvalue, and specifying that a direction of the normal vector $\vec{n}_i$ indicates a positive direction of a coordinate axis;

2.2 rotating a to-be-detected surface A that requires surface flatness detection in the precast beam to be parallel to a coordinate plane B:

$A \| B$, wherein the coordinate plane B is any plane of XOY, XOZ, and YOZ;

setting a reference vector $\vec{n}_r$ as a unit vector perpendicular to the coordinate plane B, and calculating angles between normal vectors at points in the three-dimensional point cloud model Pt and the reference vector based on a vector angle formula, wherein an angle $\theta_i$ between a normal vector $\vec{n}_i$ at the $i^{th}$ point $p_i(x_i, y_i, z_i)$ in the three-dimensional point cloud model Pt and the reference vector $\vec{n}_r$ is:

$$\theta_i = \arccos\left(\frac{\vec{n}_i \cdot \vec{n}_r}{|\vec{n}_i||\vec{n}_r|}\right);$$

and setting an angle threshold $\theta_s$ as $|\theta_s| \leq 5°$, wherein if a constraint condition $\theta_i \leq \theta_s$ is satisfied during calculation, that is, $\theta_i$ is not greater than the angle threshold $\theta_s$, the point $p_i(x_i, y_i, z_i)$ is a point forming the to-be-detected surface A, and the point is extracted into a set $A_1$; making, for points in the set $A_1$, a histogram by taking coordinate values of the points on a coordinate axis perpendicular to the to-be-detected surface A; and extracting points contained in an interval with a maximum frequency number into a set $A_2$; and 2.3 selecting, for an $h^{th}$ point $p_h(x_h, y_h, z_h)$ in the set $A_2$, K nearest neighbor points around the point to form a set $P_h^K$ according to the K-nearest-neighbor principle; defining a point distance $d_h$ of the point $p_h$ as an average value of distances between the point and points in the set $P_h^K$, and calculating an average value $\bar{d}$ and a standard deviation a of point distances in the set $A_2$ if a result is a Gaussian distribution:

$$\bar{d} = \frac{1}{N_{A_2}} \sum_{h=1}^{N_{A_2}} d_h, \ \sigma = \sqrt{\frac{1}{N_{A_2}} \sum_{h=1}^{N_{A_2}} (d_h - \bar{d})^2}, \ h \in \{1, 2 \ldots N_{A_2}\},$$

wherein $N_{A_2}$ is the number of points in the set $A_2$; and setting $\bar{d} + 2\sigma$ as a distance threshold, wherein if a constraint condition: $d_h \leq \bar{d} + 2\sigma$ is satisfied during calculation, that is, the point distance is not greater than the distance threshold, the point $p_h(x_h, y_h, z_h)$ is a point forming the to-be-detected surface, and is extracted into the to-be-detected surface A.

4. The method for detecting surface flatness of a precast beam based on a three-dimensional point cloud model according to claim 3, wherein step (3) specifically comprises the following steps:

3.1 because the to-be-detected surface A is formed by three-dimensional coordinate points and has a particular thickness, making, by passing through a point nearest to the coordinate plane B in the to-be-detected surface A, a reference plane $RP_1$ parallel to the coordinate plane B, the reference plane $RP_1$ being $a_1x+b_1y+c_1z+d_1=0$; and making, by passing through a point farthest from the coordinate plane B in the to-be-detected surface A, a reference plane $RP_n$ parallel to the coordinate plane B, the reference plane $RP_n$ being $a_nx+b_ny+c_nz+d_n=0$, wherein $a_1$, $b_1$, $c_1$, $d_1$, $a_n$, $b_n$, $c_n$, and do are coefficients;

setting an iteration distance t as a point cloud density in the to-be-detected surface A, gradually translating the reference plane from $RP_1$ to $RP_n$ by an increment of t, and calculating distances between points in the to-be-detected surface A and reference planes at each moving moment, wherein a Euclidean distance r between a $j^{th}$ point $p_j(x_j, y_j, z_j)$ in the to-be-detected surface A and an $m^{th}$ reference plane $RP_m$ is:

$$r_j = \left| \frac{a_m x_j + b_m y_j + c_m z_j + d_m}{\sqrt{a_m^2 + b_m^2 + c_m^2}} \right|, j \in \{1, 2 \ldots N_A\}, m \in \{1, 2 \ldots N_n\},$$

wherein $N_A$ is the number of points in the to-be-detected surface A, $N_n$ is the number of reference planes, an expression of the reference plane $RP_m$ is $a_mx+b_my+c_mz+d_m=0$, and $a_m$, $b_m$, $c_m$, and $d_m$ are coefficients; and defining, according to a least absolute deviation method, an optimal reference plane $RP_A$ as a corresponding reference plane when a sum of $r_j$ of the points in the to-be-detected surface A is minimal:

$$RP_A(r_j) = \operatorname{argmin} \sum_{j=1}^{N_A} r_j,$$

wherein an expression of the optimal reference plane $RP_A$ is $a_Ax+b_Ay+c_Az+d_A=0$, and $a_A$, $b_A$, $c_A$, and $d_A$ are coefficients; and 3.2 defining, for the $j^{th}$ point $p_j(x_j,y_j,z_j)$ in the to-be-detected surface A, surface flatness $f_j$ at the point as a Euclidean distance between the point $p_j$ and the optimal reference plane $RP_A$:

$$f_j = \left| \frac{a_A x_j + b_A y_j + c_A z_j + d_A}{\sqrt{a_A^2 + b_A^2 + c_A^2}} \right|, j \in \{1, 2 \ldots N_A\};$$

obtaining a flatness distribution map of the to-be-detected surface A through marking with different colors according to a value of $f_j$, to complete detection of surface flatness of the precast beam.

* * * * *